US007980161B2

(12) United States Patent
Sussmeier et al.

(10) Patent No.: US 7,980,161 B2
(45) Date of Patent: Jul. 19, 2011

(54) METHOD AND APPARATUS FOR ASSESSING BLADE LIFE OF A GUILLOTINE PAPER CUTTER

(75) Inventors: John W. Sussmeier, Cold Spring, NY (US); Boris Rozenfeld, New Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 1017 days.

(21) Appl. No.: 11/580,576

(22) Filed: Oct. 13, 2006

(65) Prior Publication Data

US 2008/0087147 A1 Apr. 17, 2008

(51) Int. Cl.
*B26D 1/00* (2006.01)
*B23Q 15/00* (2006.01)

(52) U.S. Cl. .................................... 83/13; 83/72; 83/74

(58) Field of Classification Search ................ 83/13, 74, 83/76.6, 72, 62, 62.1; 700/175, 99
See application file for complete search history.

(56) References Cited

U.S. PATENT DOCUMENTS

| | | | | | |
|---|---|---|---|---|---|
| 3,626,457 | A | * | 12/1971 | Duerr et al. | 83/74 |
| 4,200,015 | A | * | 4/1980 | Gerber | 83/22 |
| 4,771,665 | A | * | 9/1988 | Van Doorn et al. | 83/62.1 |
| 4,942,795 | A | * | 7/1990 | Linke et al. | 83/72 |
| 5,025,593 | A | * | 6/1991 | Kawaguchi et al. | 451/11 |
| 5,953,972 | A | * | 9/1999 | Nakagawa | 83/72 |
| 6,550,361 | B1 | * | 4/2003 | Davis et al. | 83/13 |
| 6,634,579 | B2 | * | 10/2003 | Drenguis | 241/30 |
| 2003/0015076 | A1 | * | 1/2003 | Tanaka et al. | 83/72 |

FOREIGN PATENT DOCUMENTS

| | | |
|---|---|---|
| JP | 11 267998 | 10/1999 |
| JP | 2000 237993 | 9/2000 |
| JP | 2001 088384 | 4/2001 |
| JP | 2005 059187 | 3/2005 |

* cited by examiner

*Primary Examiner* — Boyer D Ashley
*Assistant Examiner* — Omar Flores-Sánchez
(74) *Attorney, Agent, or Firm* — Brian A. Collins; Charles R. Malandra, Jr.

(57) ABSTRACT

A method and system for assessing when to change or sharpen a cutting blade of a paper cutter is presented. The cutting blade is operated using an electric motor that causes motion of the cutting blade, and the motion of the cutting blade causes the paper to be cut. Data is recorded about usage of the electric motor at least while cutting the paper. Based upon the data, a determination is made as to whether the cutting blade should be changed or sharpened.

6 Claims, 8 Drawing Sheets

METHOD AND APPARATUS FOR ASSESSING BLADE LIFE OF A GUILLOTINE PAPER CUTTER

TECHNICAL FIELD

The present invention relates generally to paper cutting devices, and more particularly to the input portion of a high speed inserter system, in which individual sheets are cut from a continuous web of printed materials for use in mass-production of mail pieces.

BACKGROUND OF THE INVENTION

Inserter systems, such as those applicable for use with the present invention, are mail processing machines typically used by organizations such as banks, insurance companies and utility companies for producing a large volume of specific mailings where the contents of each mail item are directed to a particular addressee.

In many respects, the typical inserter system resembles a manufacturing assembly line. Sheets and other raw materials (other sheets, enclosures, and envelopes) enter the inserter system as inputs. Then, a variety of modules or workstations in the inserter system work cooperatively to process the sheets until a finished mail piece is produced. The exact configuration of each inserter system depends upon the needs of each particular customer or installation.

Typically, inserter systems prepare mail pieces by gathering collations of documents on a conveyor. The collations are then transported on the conveyor to an insertion station where they are automatically stuffed into envelopes. After being stuffed with the collations, the envelopes are removed from the insertion station for further processing. Such further processing may include automated closing and sealing the envelope flap, weighing the envelope, applying postage to the envelope, and finally sorting and stacking the envelopes.

The input stages of a typical inserter system are depicted in FIG. 1*a*. Rolls or stacks of continuous printed documents, called a web, are provided at a web supply and fed into a web cutter where the continuous web is cut into individual sheets. In some inserter systems, the input stages of an inserter also include a right-angle turn to allow the individual pages to change their moving direction before they are fed into the inserter, as shown in FIG. 1*b*.

In general, the web material is driven in move-and-pause cycles, wherein the web material is temporarily paused for a short period to allow the cutter to cut the material into cut sheets. Thus, in each cycle, the web must be accelerated and decelerated.

FIG. 2 illustrates the input stages of an inserter system. As shown in FIG. 2, the web material 5 is driven continuously by a web driver 100 into a web-cutting module 200. The web-cutting module 200 has a cutter 210, usually in a form of a guillotine cutting blade, to cut the web material 5 crosswise into separate sheets 8.

According to current technology, there is no way of knowing if a blade set is approaching failure in the field, until the blade set actually fails. Blades are either changed at failure, thereby disrupting the mailing operation, or the blades are replaced regularly without knowledge of the actual condition of the blade set.

Guillotine cutter blades for high speed paper processing have a finite life before they become so dull that they either stop cutting paper or stop cutting reliably. Field data varies widely for blade life, and is heavily dependent upon how well the cutter is set up and maintained. Collected field data show that blade set life ranges anywhere between 5 million and 25 million cycles before a blade needs to be replaced, or removed to be re-sharpened. Blade failure during a large production mail run is highly undesirable and can cause major disruption to production mailing operations. This is especially true for those machines producing time-sensitive mail, such as end of month bills and financial statements. Often, blades are replaced long before they are near failing, during a scheduled preventative maintenance procedure to avoid such situations. Although typical blade sets are expensive and machine downtime and labor adds additional expenditure to replace them, it is more cost effective to replace them early rather than risk downtime due to failed blade sets during a live mail run.

It would be helpful to have a way to find out whether a blade set is near failure in the field, before the failure actually occurs. Often, blade failure occurs when the blade edges in a cutter become sufficiently rounded, scored or nicked, as seen through a high powered microscope. It is conjectured that blades stop reliably cutting paper when the edge radius of the blade exceeds one thousandth of an inch, whereas the blade radius specification for a new high speed cutter blade will typically not exceed one half of one thousandth of an inch.

FIG. 3 is a side view of the blade slider-crank mechanism, with key crank displacements noted for a 360-degree crank blade cycle. The blade assembly contains the upper movable blade that is pinned to the connecting rod. Not shown are two low blades that are fixed in the vertical direction but are spring loaded horizontally against each side of the upper blade. The crank mechanism is homed at zero degrees or TDC (top-dead center). Once commanded to cut, the blade begins to move downward, and contacts the inner sheet at crank displacement, A. At crank positions E, the blade has completed the cut.

FIG. 4 shows the geometry of the upper blade when the blade is located at crank Top Dead Center (TDC), where alpha (%) is the blade shear angle. At TDC, the spring loaded blades are held apart by the tab, which is integral to the blade construction. Again, as the crank rotates, the blade translates downward and this motion in conjunction with the shear angle produces a scissors effect with the lower blades and begins to cut the paper web when the upper blade makes contact with the paper at the stationary lower blade line (reference displacement, A, in FIG. 3).

The crank is coupled to a servo motor. For each blade cycle, the crank executes 360 degrees of motion. During normal cutting operation, the blade is commanded to follow a velocity profile that is typically executed in 45 milliseconds.

SUMMARY OF THE INVENTION

The present invention provides a means of assessing blade life electronically, for example through the production mailing machine's user interface, without physically removing the blades from the cutter. The present invention overcomes the disadvantages of the prior art by providing a means of assessing blade life without physically removing the blades from the cutter. Digital to Analog Conversion (DAC) plots of the blade motor performance, with and without paper, provide very accurate instantaneous measurements of the torque required to cut the paper.

Blade life is assessed using electronic means by comparing the required torque of the blade mechanism in order to cut paper, as compared to the torque required both when it was new and at predetermined known thresholds for failure. The invention enables a cutter to have its blade replaced when required, as opposed to replacing it before the blade fails without knowledge of its condition, or replacing the blade when it fails during a mail run.

BRIEF DESCRIPTION OF THE DRAWINGS

The accompanying drawings illustrate presently various embodiments of the invention, and assist in explaining the principles of the invention.

DETAILED DESCRIPTION OF AN EMBODIMENT OF THE INVENTION

An embodiment of the present invention will now be described. It is to be understood that this description is for purposes of illustration only, and is not meant to limit the scope of the claimed invention. For the purposes of assessing blade life, the following sequence is executed when a cutter is new, or when a new blade set is installed in a cutter.

First, the blade is commanded to execute a very slow constant velocity profile without paper. Preferably, this commanded profile takes roughly 2 seconds to traverse 360 crank degrees. The output of the digital filter that commands the output current of the amplifier driving the servo motor (which is coupled to the crank) is captured and stored. The plot of the digital filter output is commonly referred to as a DAC plot (digital to analog conversion). Since the input signal to the amplifier is proportional to the output current and the input current into the motor is proportional to the generated motor torque, a DAC plot provides an accurate representation of the instantaneous torque applied at the crankshaft.

Figure 1A:
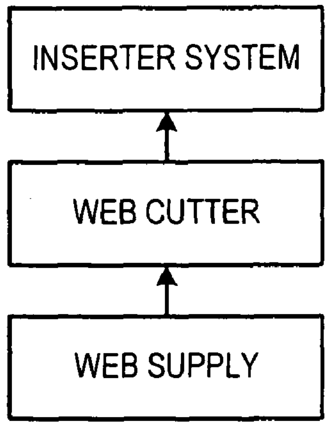
FIG. 1a ( PRIOR ART )
FIG. 1*a* is a block diagram showing the input stages of a typical inserter system.
Figure 1B:
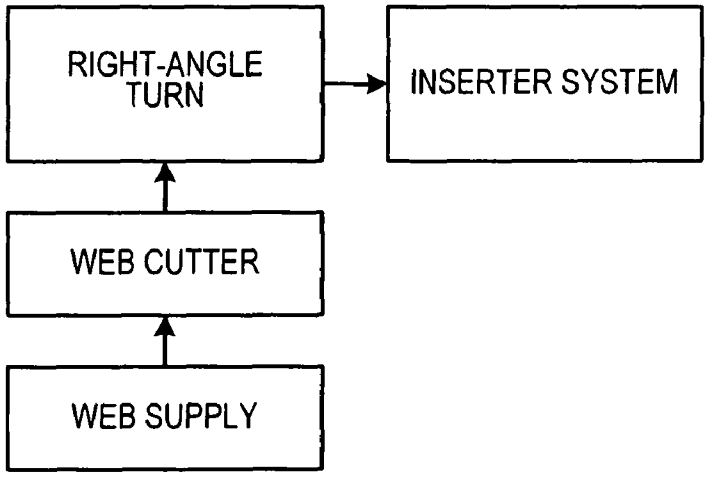
FIG. 1b ( PRIOR ART )
FIG. 1*b* is a block diagram showing the input stages of a typical inserter system including a right-angle turn.
Figure 2:
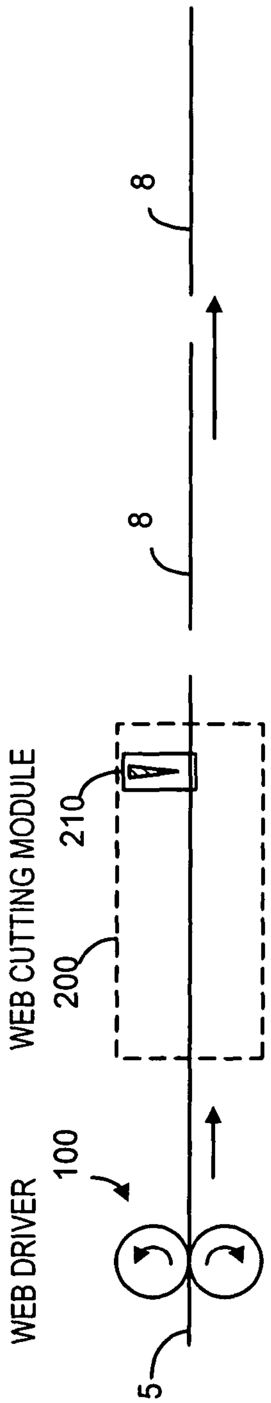
FIG. 2 (PRIOR ART)
FIG. 2 is a schematic illustration of the input stages of a typical inserter system.
Figure 3:
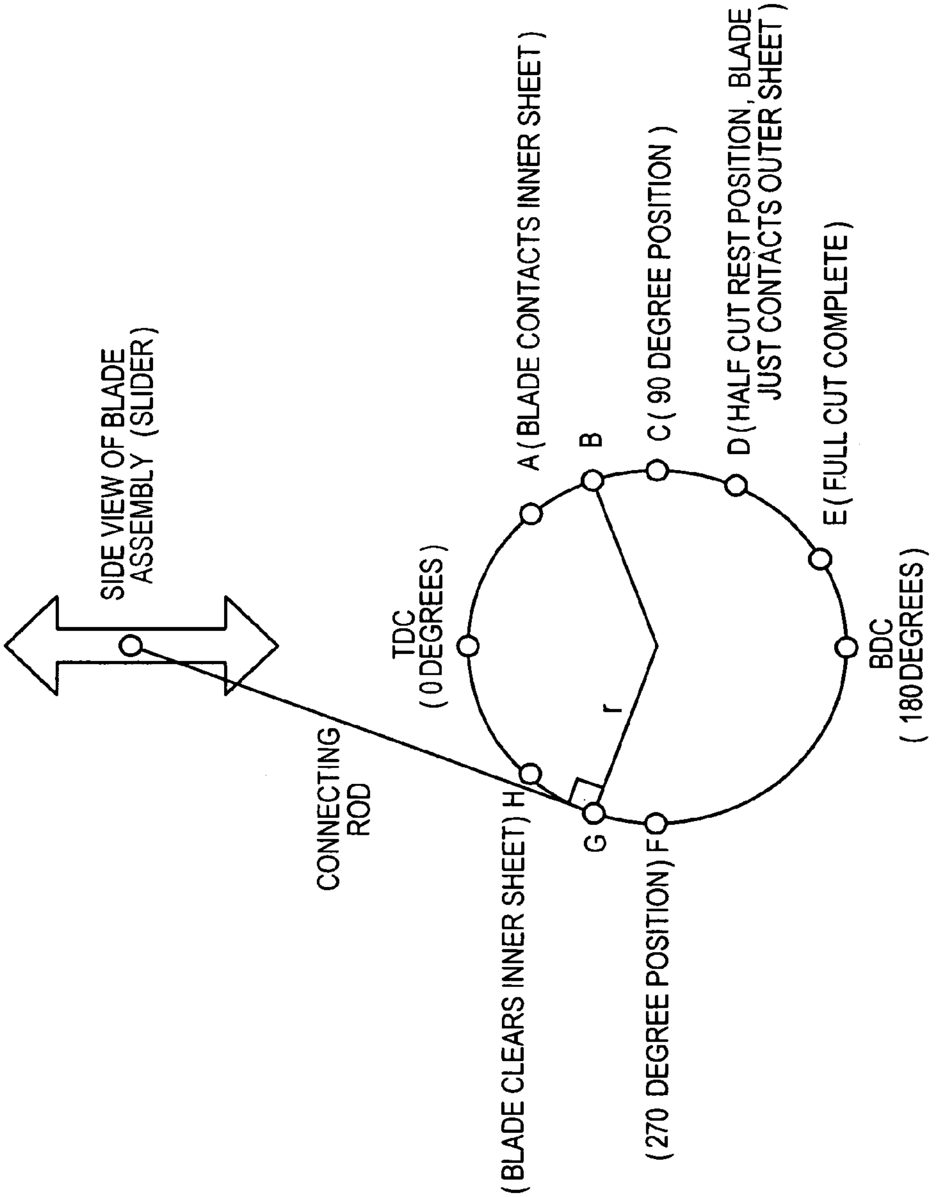
FIG. 3 (PRIOR ART)
FIG. 3 is a side view of a blade slider-crank mechanism, with key crank displacements noted for a typical 360-degree crank blade cycle.
Figure 4:
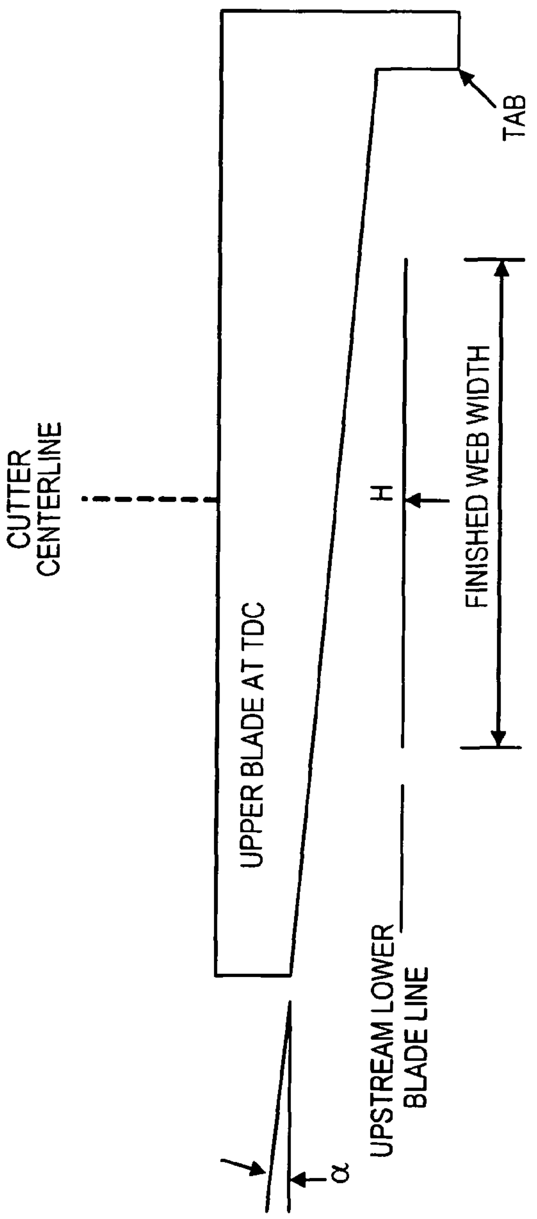
FIG. 4 (PRIOR ART)
FIG. 4 shows the geometry of the upper blade when the blade is located at crank top dead center.
Figure 5:
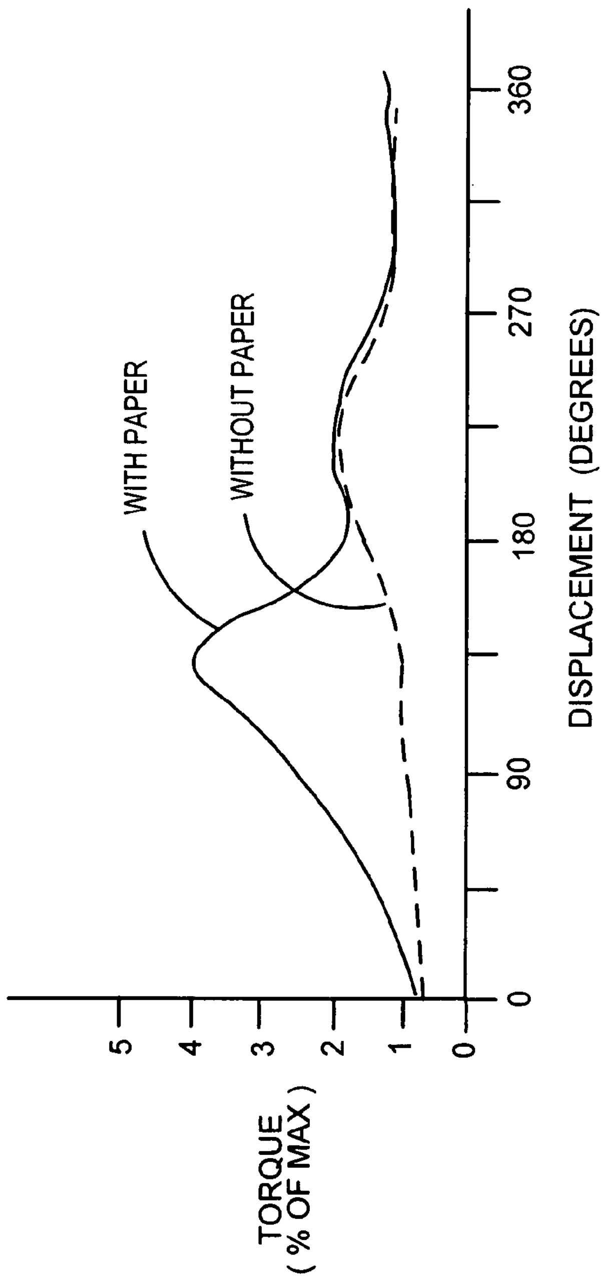
FIG. 5 shows a plot of torque as a function of crank displacement, both with and without paper.

The second step in this sequence is to insert paper between the upper and lower blades, and the upper blade is commanded to execute the identical motion profile as before, but while cutting paper. Again the DAC plot is captured and stored. Typical exemplary DAC plots with and without paper are shown in FIG. 5 as a function of crank displacement. As the plot shows, additional torque is required once the blade contacts the paper at roughly 40 degrees, and once the cut is completed at roughly 165 degrees the signals are nearly identical. The relative peak torque value on the Y-axis is 5, which corresponds to 5% of the peak torque that the amplifier/servo motor combination can deliver.

Figure 6:
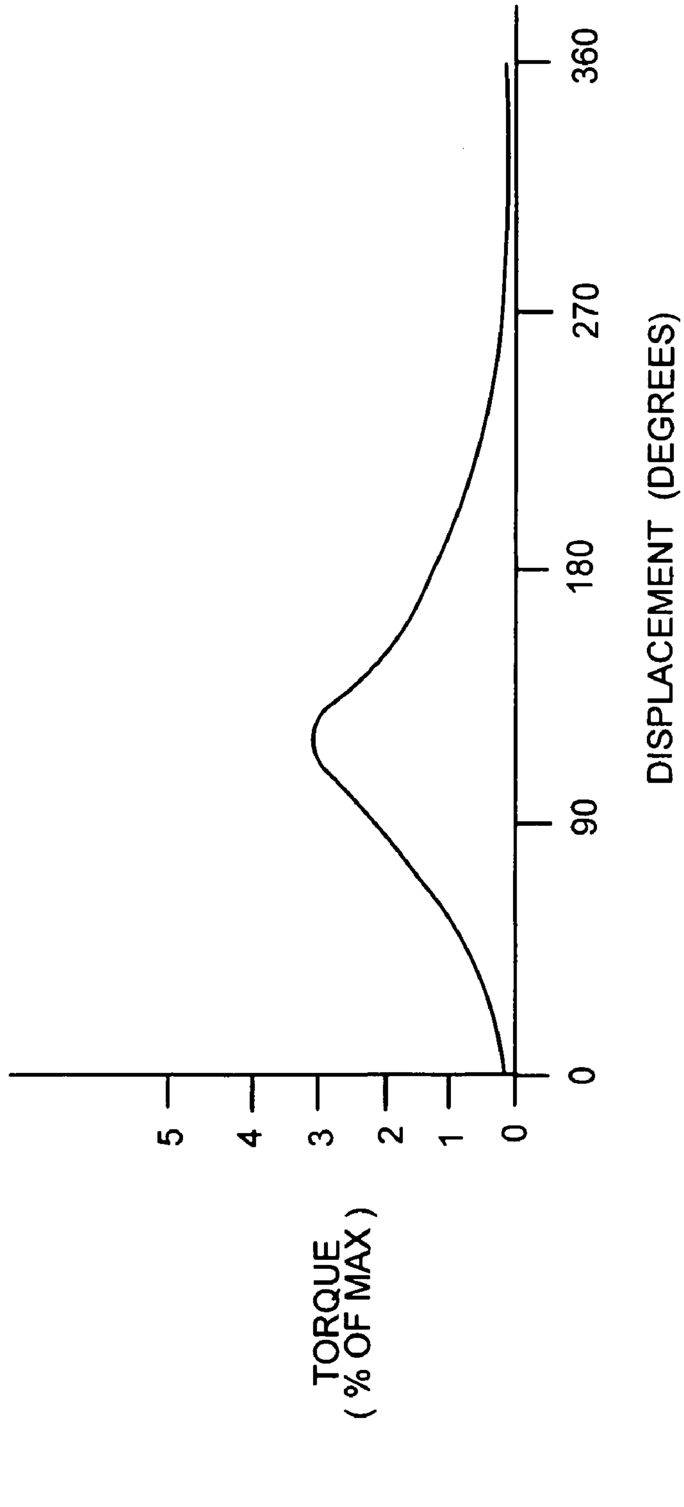
FIG. 6 shows a plot of torque as a function of crank displacement, after subtracting the torque without paper from the torque with paper.

Third in this sequence is to subtract the “No Paper” DAC signature from the “With Paper” DAC signature, resulting in a DAC signature of the instantaneous torque required of the crank motor to cut paper only, negating the effect of friction for the crank-rocker mechanism. A slow profile is preferably chosen for this procedure, at least in order to minimize the effects of overcoming inertia which could possibly add noise to these signals, particularly if the servo gains for the motor/amplifier system are set high. FIG. 6 shows a plot after the subtraction operation (also eliminating brief spikes in the data), and the resulting plot becomes the signature of a new blade.

As the blade set wears, this same procedure is executed to generate updated blade signatures. In order to compare signatures, a figure of merit must be determined based on the DAC signatures. As the blade set wears, it will take additional force to cut paper, much like it takes more effort to cut material with dull scissors. This figure of merit value will increase as the blade set wears, and end of blade life will be declared once it reaches a predetermined threshold value. Any number of methods can be used to determine a figure of merit. One such method is to sum the squares of each of the DAC values within the plot during the crank displacements where cutting is taking place (roughly 40 to 165 degrees).

For example, by using the sum of squares method, a particular blade set measured at 1 million blade cycles and 8 million blade cycles results in a figure of merit that increases from 6926 to 7793, respectively. At 8 million, the blades still cut reliably.

Once an end life figure of merit is determined empirically from field data, the cutter control system can, upon command or automatically as per an established schedule, execute this procedure and compute a new updated figure of merit. This figure of merit can be used to ultimately output a value that indicates what percentage of blade life is remaining, much like that of an ink jet cartridge.

More sophisticated methods may be utilized to determine a figure of merit with higher confidence levels. For example, statistical methods like Analysis Of Variances (ANOVA), may be used once sufficient data on blade signatures is captured across many cutters and blade usages. Regardless of the methods chosen, statistical methods will help reduce the effects of noise, in order to arrive at a more accurate assessment of blade life.

Figure 7:
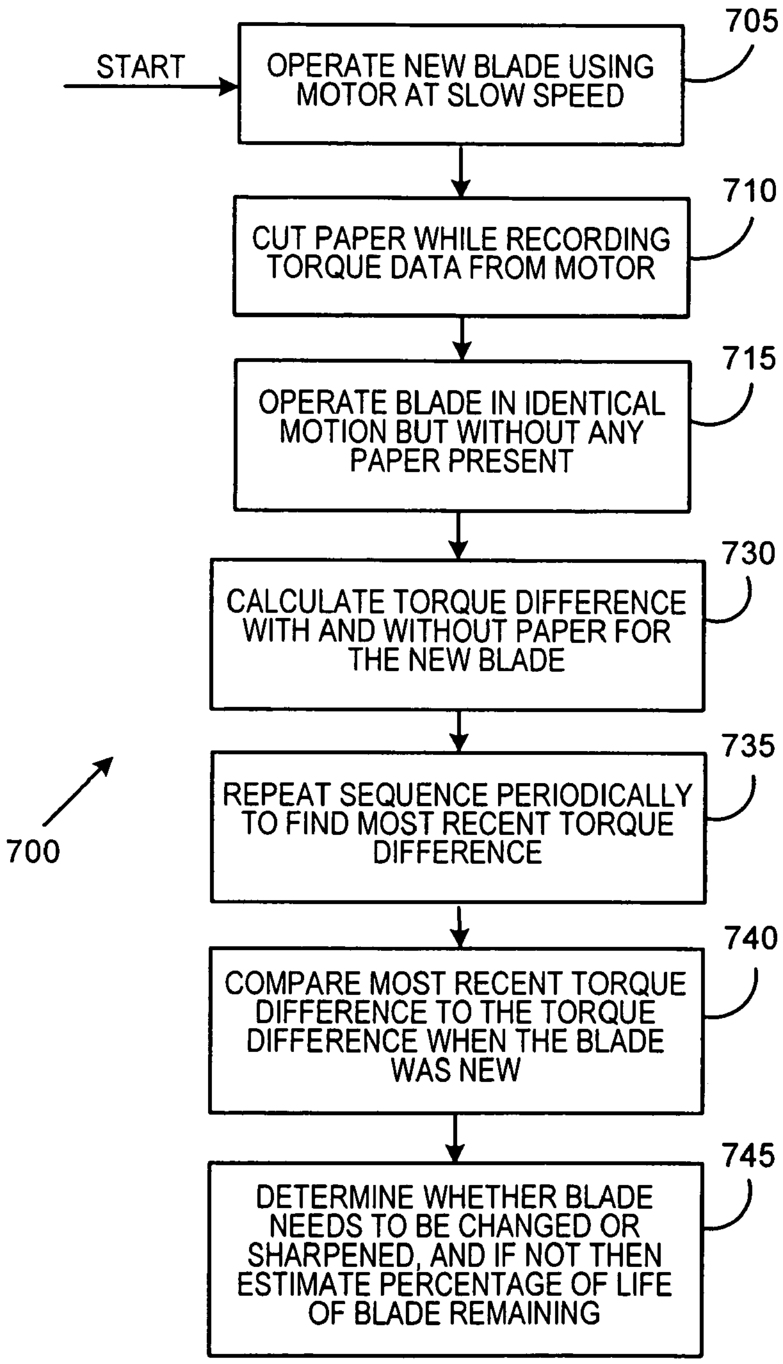
FIG. 7 is a flow chart showing a method according to an embodiment of the present invention.

Turning now to FIG. 7, a method 700 according to an embodiment of the present invention is shown by a flow chart. First, a new blade is operated 705 using an electric motor at slow speed, and thereby paper is cut 710 while torque data from the motor is recorded. Then the blade is operated 715 with a substantially identical motion, except that no paper is in the path of the blade, and a torque is again recorded. The recorded torques are then used to calculate 730 a torque difference between the paper being cut, as compared to no paper being cut. The sequence just described is repeated 735 periodically, in order to find the most recent torque difference. All of these results can then be compared 740 with each other, in order to determine 745 whether the blade needs to be changed or sharpened, and if not then a remaining percentage of blade life can be estimated (as well as estimating when the next torque measurement should be made).

Figure 8:
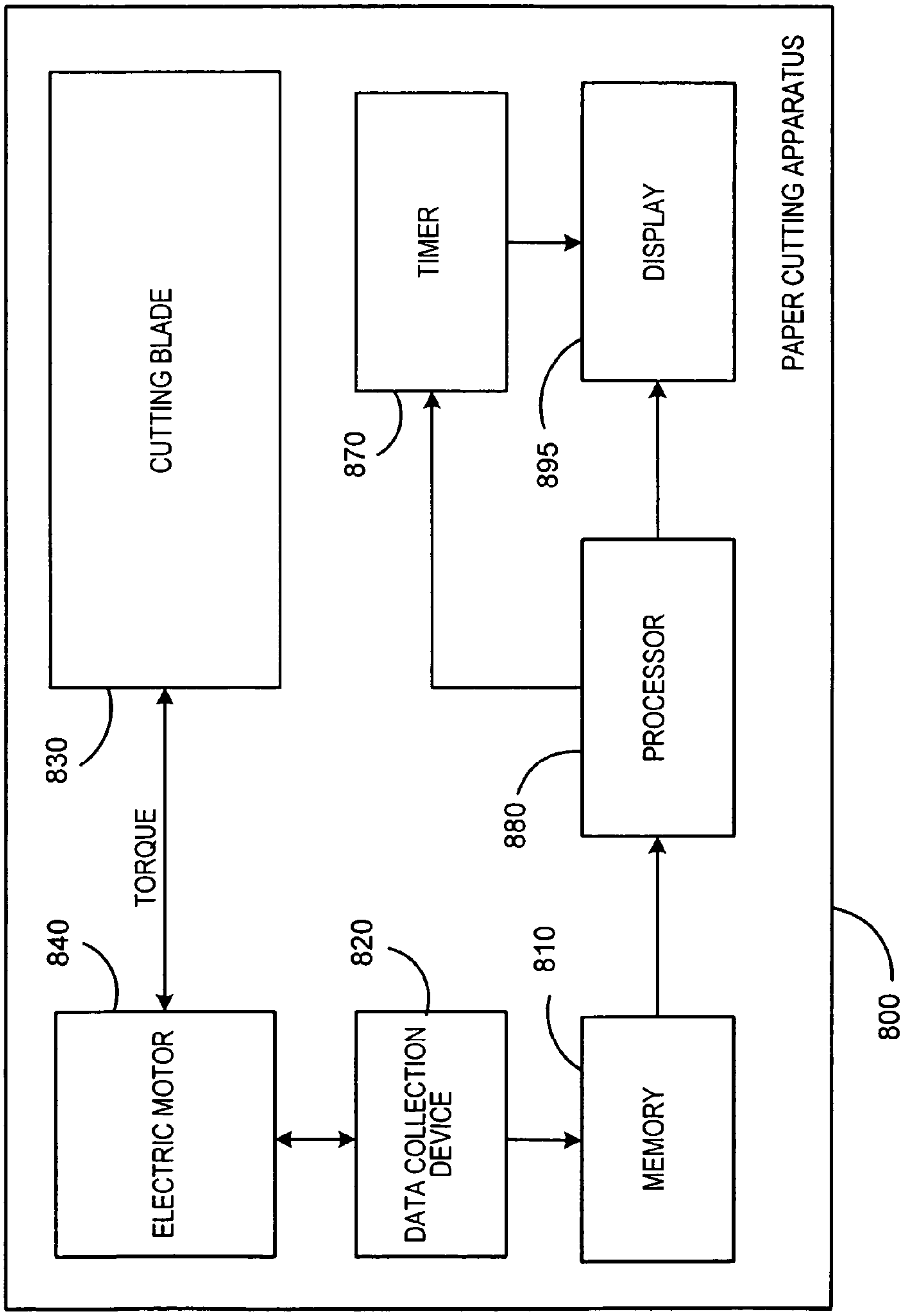
FIG. 8 is a block diagram of an apparatus according to an embodiment of the present invention.

FIG. 8 is a block diagram illustrating a paper cutting apparatus 800 according to an embodiment of the present invention. The cutting blade 830 is operated by an electric motor 840 which exerts a torque causing the blade to move in a cyclical fashion. For purposes of testing the condition of the blade, that cyclical motion should be slower than the usual motion of the blade. A data collection device 820 collects data about the torques from the electric motor 840, and that data is stored in a memory 810. The memory also stores information about the cutting blade motion, so that the motion can be substantially duplicated. A processor 880 obtains the data from several separate operations of the electric motor 840

(e.g. operations with paper and without paper), and the processor then enables a display 895 to display the estimated remaining percentage of blade life before the blade must be changed or sharpened. The display can also show when a next test of blade sharpness is due. The timer 870 can trigger further display information when a test of blade sharpness is due, or when the blade should be removed.

Algorithms for implementing this system for testing blade sharpness can be realized using a general purpose or specific-use computer system, with standard operating system software conforming to the method described above. The software product is designed to drive the operation of the particular hardware of the system. A computer system for implementing this embodiment includes a CPU processor 880 or controller, comprising a single processing unit, multiple processing units capable of parallel operation, or the CPU can be distributed across one or more processing units in one or more locations, e.g., on a client and server. The CPU may interact with a memory unit 810 having any known type of data storage and/or transmission media, including magnetic media, optical media, random access memory (RAM), read-only memory (ROM), a data cache, a data object, etc. Moreover, similar to the CPU, the memory may reside at a single physical location, comprising one or more types of data storage, or be distributed across a plurality of physical systems in various forms.

It is to be understood that all of the present figures, and the accompanying narrative discussions of preferred embodiments, do not purport to be completely rigorous treatments of the methods and systems under consideration. A person skilled in the art will understand that the steps of the present application represent general cause-and-effect relationships that do not exclude intermediate interactions of various types, and will further understand that the various structures and mechanisms described in this application can be implemented by a variety of different combinations of hardware and software, and in various configurations which need not be further elaborated herein.

What is claimed is:

1. The method of assessing when to change or sharpen a cutting blade of a paper cutter, comprising:

operating the cutting blade using an electric motor that causes motion of the cutting blade;

cutting paper due to the motion of the cutting blade;

recording data about usage of the electric motor at least while cutting the paper;

operating the cutting blade, without cutting any paper, but substantially performing the motion identical to that which is performed while cutting the paper;

recording additional data about usage of the electric motor, while performing the substantially identical motion; and making a determination from the data and the additional data as to whether the cutting blade should be changed or sharpened, wherein making the determination comprises subtracting at least part of the additional data from the data collected while cutting the paper, to yield a difference wherein making the determination includes comparing the difference recently to the difference when the cutting blade was substantially less old, wherein the determination comprises forming a first digital to analog conversion plot for recently operating the cutting blade to cut paper, and forming a second digital to analog conversion plot for recently operating the cutting blade without cutting paper, and forming a third digital to analog conversion plot for previously operating the cutting blade to cut paper, and forming a fourth digital to analog conversion plot for previously operating the cutting blade without cutting paper.

2. The method of claim 1, wherein the data is indicative of a physical parameter related to the usage of the electric motor for cutting the paper.

3. The method of claim 2, wherein the cutting blade is determined to be ready for changing if the physical parameter is a torque, and the torque is greater than a threshold.

4. The method of claim 1, wherein the cutting blade is operated by the electric motor, for assessing when to change the cutting blade, at speeds that are less than speeds normally used for cutting.

5. The method of claim 1, further comprising determining from the data a percentage of blade life remaining before the blade should be changed.

6. The method of claim 1 wherein the data comprises output from a digital filter that is operably connected to an amplifier which in turn is operatively connected to the motor.

* * * * *